United States Patent Office 2,844,523
Patented July 22, 1958

2,844,523
METHOD OF MAKING CATALYSTS

Preston L. Veltman, Severna Park, and Leon L. Baral, Baltimore, Md., and Roger W. Richardson, Baton Rouge, La., assignors of one-half each to W. R. Grace & Co., New York, N. Y., a corporation of Connecticut and Esso Research and Engineering Company, a corporation of Delaware No Drawing. Application January 19, 1955
Serial No. 482,872

7 Claims. (Cl. 196—52)

This invention relates to a method of making a catalyst and more particularly relates to a method of making an improved silica-alumina hydrocarbon conversion catalyst containing a high proportion of alumina.

It is known to manufacture satisfactory cracking catalysts containing about 12–13% alumina, the remainder consisting of silica. Such catalysts have been widely used for the catalytic cracking of hydrocarbon in commercial cracking plants. Various methods for making such catalysts are known. It has been found that silica-alumina catalysts having higher alumina contents than above noted are more resistant to deactivation by heat and particularly by steam and more resistant to degradation by metal compounds of high dehydrogenating power, such as oxides or other compounds of iron, vanadium and nickel.

Heretofore, attempts to prepare a satisfactory silica-alumina catalyst of high alumina content (between about 20 and 40% by weight) by modification of known commercial methods have not been wholly successful. It is known that free alumina catalyzes some hydrocarbon conversion reactions, and a common failing of high alumina content siliceous cracking catalyst has been that it exhibits an increased tendency to form gas and carbon in preference to the desired gasoline fraction. Also, failure to carry out the preparations under the best conditions results in a catalyst which exhibits lower stability toward deactivation, particularly in the presence of steam. The preparation of a good silica-alumina cracking catalyst apparently requires some form of chemical combination between the two principal components, and the unsatisfactory characteristics of many high alumina content catalysts may result from a failure to achieve the desired reaction between the silica and the alumina.

Silica-alumina catalysts are produced both in batch-type and continuous operations. In many respects the continuous type of operation is preferred. In one such continuous type of operation is preferred. In one such process, sodium silicate and acid are mixed to form a quick-setting, slightly basic silica hydrosol containing about 3 to 6% by weight of $SiO_2$ which is allowed to set with agitation to form a water-slurry of gel particles. The gel slurry is then adjusted to a neutral pH of 7, acid alum solution is then added, and the alumina is caused to precipitate and react with the siliceous gel by the addition of a base such as ammonia. Using this procedure it has not been possible to prepare a satisfactory silica-alumina catalyst of high alumina content. Apparently the silica hydrogel or hydrated silica particles prepared by this process are not capable of reacting effectively with the aluminum salt in excess of about 20% of alumina by weight on the silica as dry $SiO_2$. This may be due to an undesirable degree of polymerization of the silica hydrogel before it is given an opportunity to react with the alumina.

The slurry process above referred to has been modified in a manner to maintain the hydrogen ion concentration of the liquid medium continuously in the acid range and to control the nature or the extent of growth of the silica polymer before the addition of the aluminum sulfate and ammonia solutions but this modification has not always given reproducible results.

In the preparation of gels, the viscosity of the hydrosol gradually increases to a point of no flow when the entire mass suddenly sets or coagulates to a jelly-like mass or hydrogel. As used in the description of this invention, the terms "gelation" or "setting" mean the "no pour point."

According to the present invention the sodium silicate solution and sulfuric acid are mixed in such ratio as to produce a slightly acid silica hydrosol of a relatively short set time. The sodium silicate solution at a temperature of about 80–100° F. is either added to or co-mixed with a sulfuric acid solution at about 110–130° F. Alum (aluminum sulfate) solution (containing free acid) is added to the silica hydrosol before setting occurs. Ammonia solution in sufficient amount is then added with agitation to form a mixture having a pH of about 4.0 to 5.0 and this mixture is aged for a period of time to allow relatively slow precipitation of the alumina and good mixing of the alumina with the hydrated silica. The rest of the ammonia solution is then added until the mixture is about neutral.

One important feature of the present invention is the aging of the silica-alumina mixture for about 15 to 60 minutes at a pH of about 4.0 to 5.0. This allows relatively slow precipitation of hydrated alumina and also the reaction of the alumina with hydrated silica which has experienced slight aging under continuously acid conditions. Under these conditions there is increased opportunity for combination of the alumina with the silica. Agitation or mixing is continued during aging to maintain a slurry.

Referring now more specifically to the present process, sodium silicate solution having a concentration between about 3 to 6% by weight of $SiO_2$ is mixed with sulfuric acid solution having a concentration of about 35 to 40% by weight $H_2SO_4$. Instead of sulfuric acid, other inorganic acids such as hydrochloric acid, nitric acid, etc., may be used. Instead of sodium silicate solutions, potassium silicate solutions may be used. Mixing or agitation is continued throughout the process.

As a result of mixing the sulfuric acid and the sodium silicate solutions, a silica hydrosol having a pH of about 4.0 to 5.5 is formed.

The gel set time of the silica hydrosol varies in response to many conditions, such as pH, temperature concentration of $SiO_2$, and of electrolytes, etc. By "set time" or "gel set time" is meant the time required for the hydrosol to reach the hydrogel stage. Silica hydrosols prepared as described above have set times in the range of about 8 minutes to 50 minutes at temperatures of approximately 85–95° F., depending principally on the pH.

During the transition period of the hydrosol to the hydrogel, the proportion of time which has passed may be taken as an index of the degree of gelation which has occurred. Thus, if the gel set time is 50 minutes and 25 minutes have passed, this is an indication that 50% of gelation has occurred. Since gelation is caused by polymerization of the silica, the relation of the elapsed time to the set time is an indication of the degree of polymerization.

Prior to the time at which the hydrated silica sol would set if complete gelation were allowed to proceed, an aqueous alum solution containing about 20 to 25% by weight of $Al_2(SO_4)_3$ is mixed with the silica hydrosol mixture. It is preferred that the alum be added to the silica hydrosol at periods ranging from approximately 20–80% of the gel set time and imperative that it be added before complete gelation occurs. The alum solution generally contains 1.0 to 2.5% free sulfuric acid. The increased acidity of the mixture is believed effectively to stop or greatly slow down further gelation of the silica hydrosol. An aging period following the addition of the alum assures proper mixing of the silica and the alumina.

An aqueous ammonia solution containing about 28% by weight of $NH_3$ is then added at intervals or continuously to the mixture of alum solution and silica until a pH of about 4.0 to 5.0 is reached and at this time further addition of the ammonia solution is halted and the mixture aged for about 15 minutes with stirring. By this time, the silica-alumina composite has gelled and the pH of the mixture has usually increased slightly. Then addition of the ammonia solution is resumed until a pH of approximately 6.5 to 7.5 is reached. The reacting mixture is vigorously agitated to maintain the hydrogel in the form of a water suspension of gel particles.

The gel slurry is dewatered by filtration and dried. It may then be ground to the desired particle size and washed with an alkaline wash liquid and water, and finally dried again. Alternatively the gel slurry may be spray-dried, then washed with an alkaline wash liquid and water, and finally dried in a secondary drying step such as a kiln or the like. The dewatered gel may also be partially or completely washed before drying.

With the above process silica-alumina catalysts containing on the order of 20–40% $Al_2O_3$ may be prepared. These catalysts are more steam stable and more resistant to contamination than commercial silica-alumina catalysts now in use (containing about 13% $Al_2O_3$), and are also more steam stable and more selective in cracking than high alumina catalysts prepared by other methods. Also the process gives reproducible results.

EXAMPLE I 97.5 pounds or about 11.6 gallons of sodium silicate solution of about 6.64° Bé., containing 4.31 wt. percent $SiO_2$ at a temperature of about 90° F. were mixed with about 0.49 gallon of sulfuric acid solution containing about 40% $H_2SO_4$ at about 120° F. The sodium silicate had a weight ratio of about 1:3.24 of $Na_2O$ to $SiO_2$. About 0.49 gallon of the acid was placed in a 20 gallon stoneware crock. About 3 gallons of the sodium silicate solution were added to the crock to obtain a stirrable mixture. Stirring was continued throughout the preparation of the catalyst. Additional sodium silicate was then added until it was all added to obtain a pH of about 4.8, the addition taking about 16 minutes. A sample was removed for set-time determination by stop watch and was found to be 47 minutes. The mixture in the crock was then continuously stirred (1750 R. P. M.) for about six minutes, after all the sodium silicate was added.

After approximately 20% of the gel set time had elapsed there was then added to the clear silica hydrosol, 47.8 lbs. of an alum solution containing about 20% of aluminum sulfate and some free sulfuric acid (1.40%). The alum solution was at about 160° F. and the temperature after mixing was about 98° F. The pH of the resulting mixture was about 1.9.

About 2 gallons (14.5 lbs.) of the mixture were removed from the crock to make room for the ammonia solution to be added during ammoniation. The mixture before ammoniation was aged for 30 minutes at substantially room temperature and during aging agitation was continued.

The ammoniation was started and about 4 lbs. of aqueous ammonia solution of about 28% ammonia concentration by weight were added to obtain a pH of about 3.9. More of the ammonia solution was added until the pH was about 4.2. This period of ammoniation was about 7 minutes. Then the mixture was aged for about 15 minutes at a temperature of about 95° F. while continuing agitation. Thereafter, about 4 lbs. of the ammonia solution were added and the pH rose to 5.6. Further amounts of ammonia solution were added for about 16 minutes until a total of about 9.5 lbs. of ammonia solution were added and the final pH was about 7.15. The mixture then consisted of a suspension or slurry of silica-alumina hydrogel particles.

The suspension was then dewatered on a crock filter and dried in a Proctor and Schwartz forced draft oven at 240°–250° F. for 13 hours and 13.0 lbs. of catalyst were recovered. The dried gel was pulverized and then slurried in 7 gallons of water at 150° F., filtered and the filter cake washed on the filter first with 18 gallons of water at 150° F., then with 6 gallons of a 1% $NH_3$ solution at 75° F. and then with 51 gallons of water at 150° F. and then with 3 gallons of a 1% $NH_3$ solution at 75° F. and then with 18 gallons of water at 150° F. The filter cake was then further dried in the Proctor and Schwartz dryer for 17 hours at 280° F. and 6.5 lbs. of catalyst recovered.

The following inspection was obtained on the catalyst prepared according to the above example (percentages by weight).

*Chemical analysis (volatile-free basis)*

Percent $Al_2O_3$ ---------------------------------- 39.1
Percent $SO_4$ ------------------------------------- 0.08
Percent $Na_2O$ ------------------------------------ 0.065
Percent $SiO_2$ ------------------------------------ Balance The dried catalyst was then pilled and tested for catalyst cracking activity and selectivity after exposure to severe steaming conditions (24 hours at 1050° F. under 60 p. s. i. g. steam pressure). Two batches of this catalyst were made according to the same method given in Example I and cracking tests were carried out on these two catlysts designated hereinafter as 1 and 1a. The same steaming treatment was given a commercial 13% alumina catalyst. The cracking test was carried out on 3/16" pills under fixed bed conditions using a space rate of 0.6 liquid volumes of oil per hour per volume of catalyst at 850° F. for a 2-hour process period. The feed stock was a light East Texas gas oil of about 450° F.–700° F. boiling range and 33.5° API gravity. The following results were obtained:

| Catalyst | High $Al_2O_3$ Catalyst Prepared according to Example I | | 13% $Al_2O_3$ Catalyst |
| --- | --- | --- | --- |
| | 1 | 1a | Commercial |
| Liquid Product boiling below 400° F., Vol. Percent | 42.5 | 42.5 | 26 |
| Gas Producing Factor | 1.34 | 1.30 | 1.0 |
| Carbon Producing Factor | 0.89 | 1.03 | 1.0 |

From this comparison it may be seen that the catalysts of the example were very much more resistant to the deactivating effect of the steam treatment than ordinary commercial catalyst, as evidenced by the much higher conversion of gas oil to naphtha or gasoline at the same test conditions. The gas and carbon producing factors are indices of the selectivity of the cracking reaction and represent the ratio of the weight of gas or carbon formed by a standard reference catalyst at the same conversion level. The catalysts of the example were slightly less selective for naphtha or gasoline production than commercial 13% $Al_2O_3$ catalyst as shown by the higher gas producing factors; but they are considerably better in this respect than other high alumina-content catalysts, notably in that carbon producing factors were as good or better than observed with commercial 13% $Al_2O_3$ catalyst.

EXAMPLE II

In another example, 97.5 lbs. or about 11.6 gallons of sodium silicate solution of about 6.64° Bé., containing about 4.31 weight percent $SiO_2$ were mixed with about 0.49 gallon of sulfuric acid solution containing about 40% $H_2SO_4$. The sodium silicate had a weight ratio of about 1:3.24 of $Na_2O$ to $SiO_2$. About 0.49 gallon of the acid was placed in a 20 gallon stoneware crock. About 3 gallons of the sodium slicate solution were added to the crock to obtain a stirrable mixture. Additional sodium silicate solution was then quickly added until it was all added to obtain a pH of 5.1, the addition taking about 4 minutes. Stirring was continued during the preparation of the catalyst. The pH of the mixture was adjusted with 40% $H_2SO_4$ to about 4.95. A sample was removed for set time determination and was found to be 8 minutes. The mixture in the crock was then continuously stirred for about 6 minutes after the addition of the sodium silicate was completed. A clear silica hydrosol solution was produced and to this solution there were then added 47.8 lbs. of alum solution containing about 20% of aluminum sulfate and some free sulfuric acid (1.40%). The alum solution was at about 165° F. and the temperature after mixing was about 107° F. The pH of the resulting mixture was 1.9.

About 1.5 gallons of the mixture (12.75 lbs.) were removed from the crock to make room for the ammonia solution to be added during ammoniation. The mixture in the crock was aged for about 30 minutes at a temperature of substantially 100° F. and during aging agitation was continued.

The ammoniation was started by adding about 4 lbs. of an aqueous ammonia solution of about 28% ammonia concentration by weight and the resulting mixture had a pH of about 3.9. More of the ammonia solution was added during a period of about 27 minutes until the pH was about 4.15. Then the mixture was aged for about 15 minutes at a pH of 4.15 while continuing the agitation of the mixture. Then additional amounts of the ammonia solution were added over a period of about 8 minutes until the pH rose to 7.2. The total amount of ammonia solution added was 10.4 lbs.

The suspension or mixture was then dewatered on a crock filter and dried in a Proctor and Schwartz oven at about 280° F. for about 17 hours and 14 lbs. of catalyst were recovered. The dry gel was then ground in a Raymond mill to pass through a .039 inch screen. The dried ground gel was slurried in water, filtered and the filter cake washed in the same manner as described in Example I. The filter cake was dried in a Proctor and Schwartz dryer for 17 hours at 280° F. and about 6.75 lbs. of catalyst were recovered.

The following inspection was obtained on the catalyst prepared according to Example II (percentages by weight).

Chemical analysis (volatile free basis)

Percent $Al_2O_3$ ---------------------------- 38.6
Percent $SO_4$ ------------------------------ 0.12
Percent $Na_2O$ ---------------------------- 0.053
Percent $SiO_2$ ---------------------------- Balance The dried catalyst was then pilled and tested for catalyst cracking activity and selectivity after exposure to severe steaming conditions (24 hours at 1050° F. under 60 p. s. i. g. steam pressure). Two batches of this catalyst were made according to the same method given in Example II and cracking tests were carried out on these two catalysts designated hereinafter as 2 and 2a. Each catalyst was pilled into 3/16" pills and the cracking test was carried out under fixed bed conditions using a space rate of 0.6 liquid volume of oil per hour per volume of catalyst at 850° F. for a 2 hour process period. The feed stock was a light East Texas gas oil of about 450–700° F. boiling range and 33.5° API gravity.

The following results were obtained for the two catalysts of this example:

| Catalyst | 2 | 2a |
|---|---|---|
| Liquid Product Boiling Below 400° F., Vol. Percent | 42.5 | 42.5 |
| Gas Producing Factor | 1.24 | 1.26 |
| Carbon Producing Factor | 0.93 | 1.08 |

From the above results it will be seen that the catalysts prepared according to Example II are very similar to the catalysts prepared according to Example I and that the catalysts are very much more resistant to the deactivating effect of the steam treatment than ordinary commercial catalyst as evidenced by the much higher conversion of gas oil to naphta or gasoline at the same test conditions (see Example I).

Some additional batches of catalyst were made containing about 40% of alumina. The proportions of reagents were about the same as those given in Examples I and II. The procedure was generally the same as that given in Examples I and II, except that some of the catalysts were prepared with an aging step during ammoniation and some were prepared without the aging step.

Three catalysts were prepared without aging during ammoniation and two catalysts were prepared with aging at a pH of 4.2 during the ammoniation step. The general procedure is set forth in the following description and more specific details are given thereafter in tabular form.

Sodium silicate ($Na_2O \cdot 3.2\ SiO_2$) of about 6.0–7.0° Bé. at a temperature of 80–100° F. was added to about 33–36° Bé. $H_2SO_4$ at 110–130° F. to attain a set time of the silica hydrosol about 10–50 minutes as desired. Instead of adding the silicate to the acid, the two may be co-mixed.

The mixture of acid and silicate was then aged by further mixing for a period of time between about 20% and 80% of the set time. In no case should the aging period approach too near the total set time.

Alum solution containing about 20% aluminum sulfate and about 1.4% free $H_2SO_4$ of about 30–32° Bé. was then added to the silica hydrosol to introduce the required amount of alumina ($Al_2O_3$). The alum solution temperature was in the range of about 140°–170° F.

After the addition of the alum solution, the mix was aged, while being stirred, for 15 minutes to 60 minutes. Tests were carried out to obtain a comparison of the results obtained using catalysts prepared according to the present invention and catalysts prepared by the conventional method.

In accordance with this invention, 28% aqua ammonia was added to obtain a pH of 4.0 to 5.0, preferably about 4.2, and mixing was continued at this pH for about 15 minutes, although a longer period up to 60 minutes may be used. Ammoniation with 28% aqua ammonia was then resumed up to a pH of about 6.5–7.5. During the mixing, hydrogel particles are formed as a slurry.

Other catalysts were prepared by adding the 28% $NH_3$ solution continuously until a pH level of 7.0–7.4 was reached without interruption for an aging period at the level of about 4.2 pH.

In both series of preparations the catalyst slurry after ammoniation, was filtered and dried at about 225–350° F., pulverized and washed substantially free of $SO_4$ and $Na_2O$, essentially as described in connection with Example I.

The specific details for producing the catalysts are given in the following Table 1.

TABLE 1

| Catalyst | Preparation without Aging During Ammoniation | | | Preparation with Aging at 4.2 pH During Ammoniation | |
|---|---|---|---|---|---|
|  | 3 | 4 | 5 | 6 | 7 |
| Sodium Silicate, °Bé | 6.2 | 6.2 | 6.4 | 6.7 | 6.9 |
| Sodium Silicate, Temp., °F | 80 | 80 | 80 | 90 | 98 |
| $H_2SO_4$, °Bé | 33.6 | 33.7 | 33.5 | 35.5 | 35.7 |
| $H_2SO_4$, Temp., °F | 120 | 120 | 120 | 120 | 127 |
| Mix, pH | 4.4 | 4.7 | 4.6 | 4.6 | 4.7 |
| Mix, Temp., °F | 91 | 88 | 90 | 100 | 103 |
| Mix, Set Time, Min | 22 | 21 | 21 | 16 | 10 |
| Alum, °Bé | 30 | 30 | 30 | 31 | 31.1 |
| Alum, Temp., °F | 165 | 165 | 140 | 160 | 160 |
| Ammonia, percent | 28 | 28 | 28 | 28 | 28 |
| 1st Step, pH | | | | 4.2 | 4.2 |
| Aging at 1st Step, Time, Min | | | | 15 | 15 |
| pH after aging | | | | 4.4 | 4.5 |
| Final pH | 7.4 | 7.4 | 7.6 | 7.2 | 7.2 |
| Final Temp., °F | 124 | 116 | 120 | 117 | 118 |

Catalysts designated 3, 4, and 5 (without aging during ammoniation) and catalysts designated 6 and 7 (with aging during ammoniation) had the following analyses.

| Catalyst | 3 | 4 | 5 | 6 | 7 |
|---|---|---|---|---|---|
| Wt. percent $Al_2O_3$ | 40.8 | 39.4 | 42.2 | 38.2 | 38.3 |
| Wt. percent $SO_4$ | 0.25 | 0.33 | 0.33 | 0.25 | 0.21 |
| Wt. percent $Na_2O$ | 0.029 | 0.044 | 0.042 | 0.14 | 0.056 |
| Wt. percent $SiO_2$ | Balance | Balance | Balance | Balance | Balance |

The dried catalyst was then pilled and tested for catalytic cracking activity and selectivity after exposure to the severe steaming treatment above described in connection with Examples I and II. The cracking test was carried out in a fixed bed using a space rate of 0.6 liquid volume of oil per hour per volume of catalyst at 850° F. for a two hour process period. The feed stock was a light East Texas gas oil of about 450 to 700° F. boiling range and 33.5° API gravity.

The following results were obtained in cracking:

| Catalyst | 3 | 4 | 5 | 6 | 7 |
|---|---|---|---|---|---|
| Liquid Product Boiling Below 400° F., Vol. Percent | 36.0 | 36.5 | 36.5 | 41.5 | 41.5 |
| Gas Producing Factor | 1.69 | 1.53 | 1.67 | 1.25 | 1.29 |
| Carbon Producing Factor | 1.28 | 1.14 | 1.30 | 1.03 | 1.05 |

The data above reported show that catalysts produced with the aging step during ammoniation have much higher activity values and better selectivity values than the catalysts made without the aging step during ammoniation.

The preferred method for commercial application of the process consists of mixing the various reagent streams in mixing nozzles while pumping continuously between holding tanks equipped with paddle stirrers. Thus in the first step a continuous stream of dilute sodium silicate is mixed with acid in a nozzle and the resulting acid hydrosol is discharged into an agitated tank. It may be preferred to mix quickly to a pH well on the acid side, say about 3.0 to 3.5 which would give a set time of several hundred minutes and then adjust to the required pH by careful addition of the sodium silicate solution. The acid hydrosol or gel slurry is continuously pumped from the first tank through a mixing nozzle in which acid alum solution is added, and discharged into a second agitated tank. From the second tank the acid solution or suspension is continuously pumped to a third tank through a mixing nozzle in which the ammonia solution is added to obtain a pH of about 4.0–5.0, and the mixture is aged while continuing mixing and agitation. Then more ammonia solution is added to raise the pH of the mixture in the third tank to about 6.5 to 7.5 and slurry is discharged continuously to the dewatering filter.

The gelling time of the silica hydrosol may be between about 10 and 50 minutes. The holding time in the first tank or vessel may vary between 2 minutes and 40 minutes. The pH in the first tank may be varied between about 4.0 and 5.5.

In the second tank or vessel after the addition of the aqueous alum solution containing free acid, the holding time may vary between about 10 and 30 minutes and the pH may be varied between about 1.8 and 2.5. The amount of alum added may be varied to give a high alumina containing silica-alumina catalyst so that the final catalyst will contain about 20 to 40% $Al_2O_3$ by weight.

In the third tank or vessel the holding time of the partially ammoniated mixture may be varied between about 10 and 120 minutes and the final pH may be varied between about 6.5 and 7.5.

In general the temperature in the first tank will be slightly above room temperature, usually between 85 and 120° F. The temperature in the remaining operations will be in a similar range, and no special provision for heating or cooling will be necessary.

The concentration of the sodium silicate solution may be varied between about 3 and 6 wt. percent $SiO_2$. The sodium silicate may be of different compositions and may be one selected where the ratio of $Na_2O$ to $SiO_2$ varied from about 1 to 1, to 1 to 4. The sulfuric acid used for reacting with the sodium silicate solution may have a concentration which can be varied from about 30 to 60% by weight of $H_2SO_4$.

Aluminum salts such as aluminum nitrate, aluminum chloride, etc. may be used but alum (aluminum sulfate) is preferred because it is cheaper.

Acid silica hydrosols prepared in other ways such as by passing a sodium silicate solution through cation exchange resin may be used in the present process.

What is claimed is:

1. A process of preparing silica alumina catalysts containing high amounts of alumina in excess of about 20% consisting of preparing a silica hydrosol having a pH below about 5.5, effecting partial gelation of the silica hydrosol at said pH, then adding an acidic aqueous aluminum salt solution to said partially gelled silica hydrosol and thereby lowering the pH of the mixture, holding the resultant mixture for a limited time at the lowered pH, then adding only a sufficient amount of an aqueous solution of ammonia with agitation to raise the pH of the mixture to about 4.0 to 5.0 and cause the combination of alumina with the silica, aging the resulting mixture for a period of time to effect slow and substantially complete precipitation of alumina, then adding additional aqueous ammonia with agitation to raise the pH to about 6.5 to 7.5 and cause precipitation of the remaining alumina, dewatering the suspension of silica-alumina hydrogel, and then drying, washing and redrying the gel particles to produce an improved catalyst.

2. A process according to claim 1 wherein the aging at a pH of 4.0 to 5.0 is for at least about 15 minutes.

3. In a process for preparing silica-alumina catalysts containing about 40% alumina by weight, the steps consisting of providing a silica hydrosol at an acid pH below about 5.0, effecting partial gelation of the silica hydrosol at said pH, adding alum solution containing free acid to the partially gelled hydrosol and thereby lowering the pH of the mixture to about 2, aging the resulting mixture at the lowered pH, then raising the pH to about 4.2–4.6 by the addition of an aqueous solution of ammonia, aging the resulting mixture at a pH of about 4.2–4.6 for about 15 minutes to effect slow and substantially complete precipitation of alumina, then raising the pH of the mixture to about the neutral point by adding additional ammonia with continuing agitation and cause precipitation of the remaining alumina, whereby a silica-alumina composite of hydrogel particles is produced.

4. In a process for the preparation of silica-alumina catalysts containing between about 20% and 40% alumina by mixing an alkali metal silicate aqueous solution and an inorganic acid in such amounts that the pH of the mixture is below about 5.0, adding an acid aqueous solution of an aluminum salt to the mixture, precipitating alumina by the addition of ammonia, and washing and drying the resulting composite, the improvement consisting of adding said ammonia to the silica-alumina mixture until a pH of 4.0–5.0 is reached, aging the resulting mixture with agitation while it is at said pH of 4.0–5.0 for at least 15 minutes to effect slow and substantially complete precipitation of the alumina onto the silica, and then adding additional ammonia to raise the pH of the mixture to about the neutral point and cause precipitation of the remaining alumina.

5. A process according to claim 4 wherein the set time of the silica hydrosol is selected so that the silica hydrosol sets to a hydrogel before or during said aging step at a pH of 4.0–5.0 but after all of the aluminum salt solution is added thereto.

6. A process for cracking hydrocarbon oils which comprises passing the oil under cracking conditions through a cracking zone containing a silica-alumina catalyst containing in excess of about 20% alumina prepared by a process consisting of forming a silica hydrosol having a pH below about 5.5, effecting partial gelation of said hydrosol at said pH, adding to said partially gelled silica hydrosol an acidic aqueous aluminum salt solution and thereby lowering the pH of the mixture, holding the resultant mixture for a limited time at the lowered pH, adding thereto with agitation an amount of alkaline agent sufficient to raise the pH of the mixture to about 4.0 to 5.0 and cause the combination of alumina with the silica, aging the resulting mixture to effect slow and substantially complete precipitation of alumina, then adding additional alkaline agent with agitation to raise the pH to about 6.5 to 7.5 and cause precipitation of the remaining alumina, filtering the resulting silica-alumina composite, and then drying, washing, and redrying the composite.

7. A process of preparing silica-alumina catalysts containing amounts of alumina in excess of 20% consisting of commingling sufficient amounts of mineral acid and alkali metal silicate solution whereby a partially gelled silica hydrosol having a pH below about 5.5 is formed, adding an acidic aqueous aluminum salt solution to said partially gelled silica hydrosol and thereby lowering the pH of the mixture to about 2, aging the resulting mixture for a limited time at the lowered pH, adding sufficient ammonia to the mixture until a pH of 4.0–5.0 is reached, aging said mixture for a period of time to allow slow and substantially complete precipitation of alumina, adding additional ammonia to raise the pH of the mixture to about the neutral point and cause precipitation of the remaining alumina, and washing and drying the resulting silica-alumina composite.

References Cited in the file of this patent

UNITED STATES PATENTS

| | | |
|---|---|---|
| 2,565,886 | Ryland | Aug. 28, 1951 |
| 2,595,339 | Den Herber et al. | May 6, 1952 |
| 2,611,738 | Webb | Sept. 23, 1952 |
| 2,694,673 | Kimberlin et al. | Nov. 16, 1954 |
| 2,701,793 | Ashley | Feb. 8, 1955 |